United States Patent
Rambaud

(10) Patent No.: US 10,618,590 B2
(45) Date of Patent: Apr. 14, 2020

(54) THREE-WHEELED SCOOTER

(71) Applicant: SWINCAR, Allan (FR)

(72) Inventor: Pascal Rambaud, Allan (FR)

(73) Assignee: SWINCAR, Allan (FR)

( * ) Notice: Subject to any disclaimer, the term of this patent is extended or adjusted under 35 U.S.C. 154(b) by 0 days.

(21) Appl. No.: 16/345,631

(22) PCT Filed: Oct. 11, 2017

(86) PCT No.: PCT/FR2017/052790
§ 371 (c)(1),
(2) Date: Apr. 26, 2019

(87) PCT Pub. No.: WO2018/078235
PCT Pub. Date: May 3, 2018

(65) Prior Publication Data
US 2019/0263469 A1 Aug. 29, 2019

(30) Foreign Application Priority Data
Oct. 27, 2016 (FR) ..................... 16 60440

(51) Int. Cl.
*B62K 5/08* (2006.01)
*B62K 5/06* (2006.01)
*B62K 5/02* (2013.01)
*B62K 3/00* (2006.01)

(52) U.S. Cl.
CPC .................. *B62K 5/08* (2013.01); *B62K 5/02* (2013.01); *B62K 5/06* (2013.01); *B62K 3/002* (2013.01)

(58) Field of Classification Search
CPC ... B62K 5/08; B62K 5/02; B62K 5/06; B62K 5/10; B62K 3/002
USPC ................ 280/62, 87.041, 87.042, 87.043
See application file for complete search history.

(56) References Cited

U.S. PATENT DOCUMENTS

| | | | |
|---|---|---|---|
| 6,991,242 B2* | 1/2006 | Teng ...................... | B62K 3/002 280/87.041 |
| 9,656,709 B2* | 5/2017 | O'Connell .............. | B62H 1/12 |
| 2010/0234186 A1* | 9/2010 | Fan .................... | A63B 22/0061 482/51 |

(Continued)

FOREIGN PATENT DOCUMENTS

| CN | 202657178 U | 1/2013 |
|---|---|---|
| WO | 2009091136 A2 | 7/2009 |

OTHER PUBLICATIONS

English Machine Translation to Abstract of CN202657178.
(Continued)

*Primary Examiner* — John D Walters
(74) *Attorney, Agent, or Firm* — Cantor Colburn LLP

(57) ABSTRACT

In the neutral position, the scooter has a longitudinal plane of symmetry and includes:
- a steering column which is generally vertical and pivotally mounted relative to a base about a steering axis to enable the steering of a front wheel;
- two spars which support the feet of the user, each spar comprising a front portion which is pivotally mounted on the base about an oblique pivot axis;
- two rear wheels, each one being rotatably mounted on a support about its axis, the support being pivotally mounted relative to the rear portion of the corresponding spar about a hinge axis which is inclined forwards, with respect to the vertical, by an angle γ comprised between 0° and 30°.

21 Claims, 6 Drawing Sheets

(56) References Cited

U.S. PATENT DOCUMENTS

2011/0298193 A1    12/2011  Fan
2017/0029060 A1*  2/2017  Kim .......................... B62K 5/02
2017/0190374 A1*  7/2017  Quaglia ................... B62K 5/02
2018/0251181 A1*  9/2018  Huang ................... B62K 3/002

OTHER PUBLICATIONS

International Search Report for Application No. PCT/FR2017/052790.

Written Opinion for Application No. PCT/FR2017/052790.

* cited by examiner

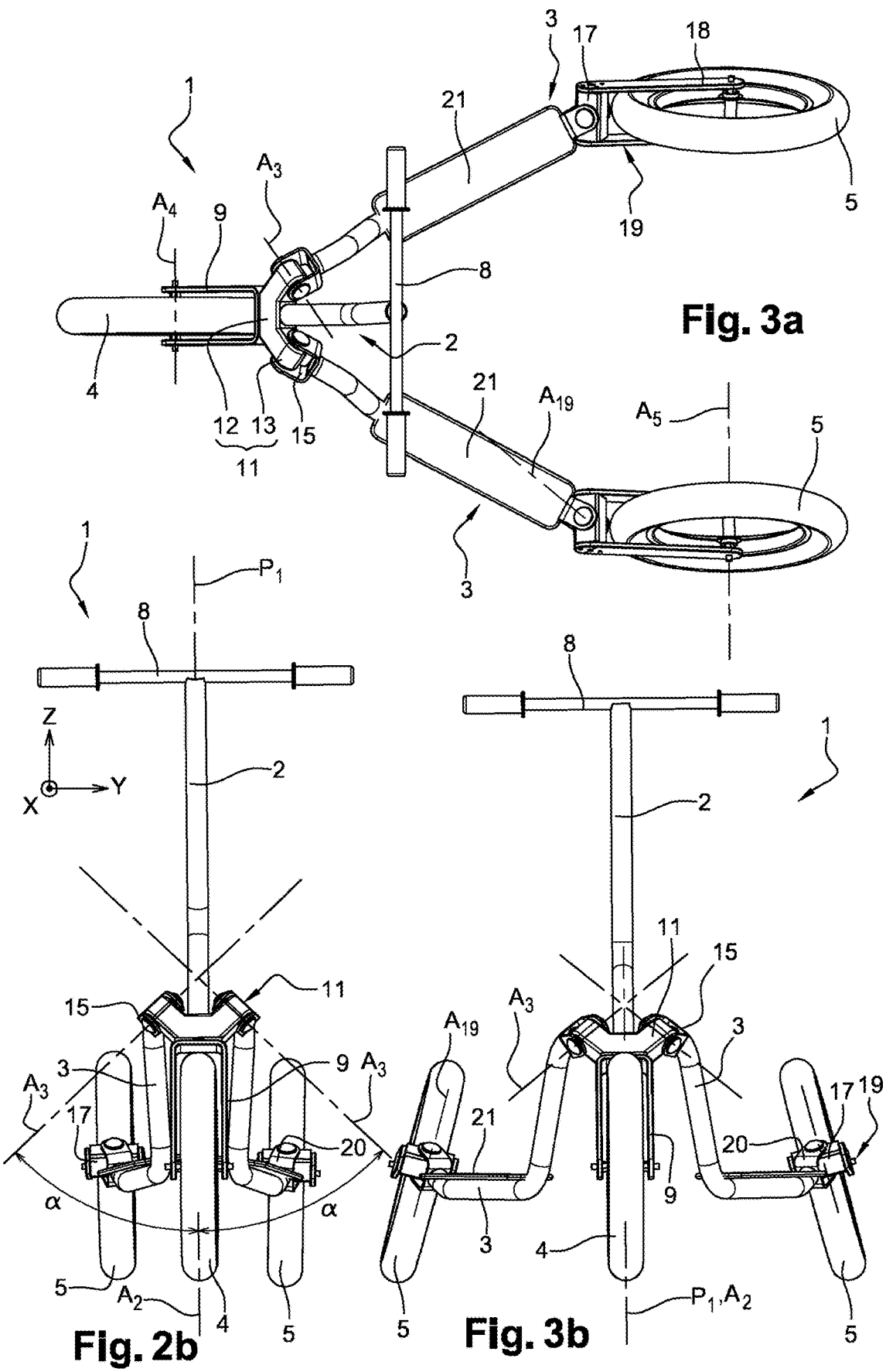

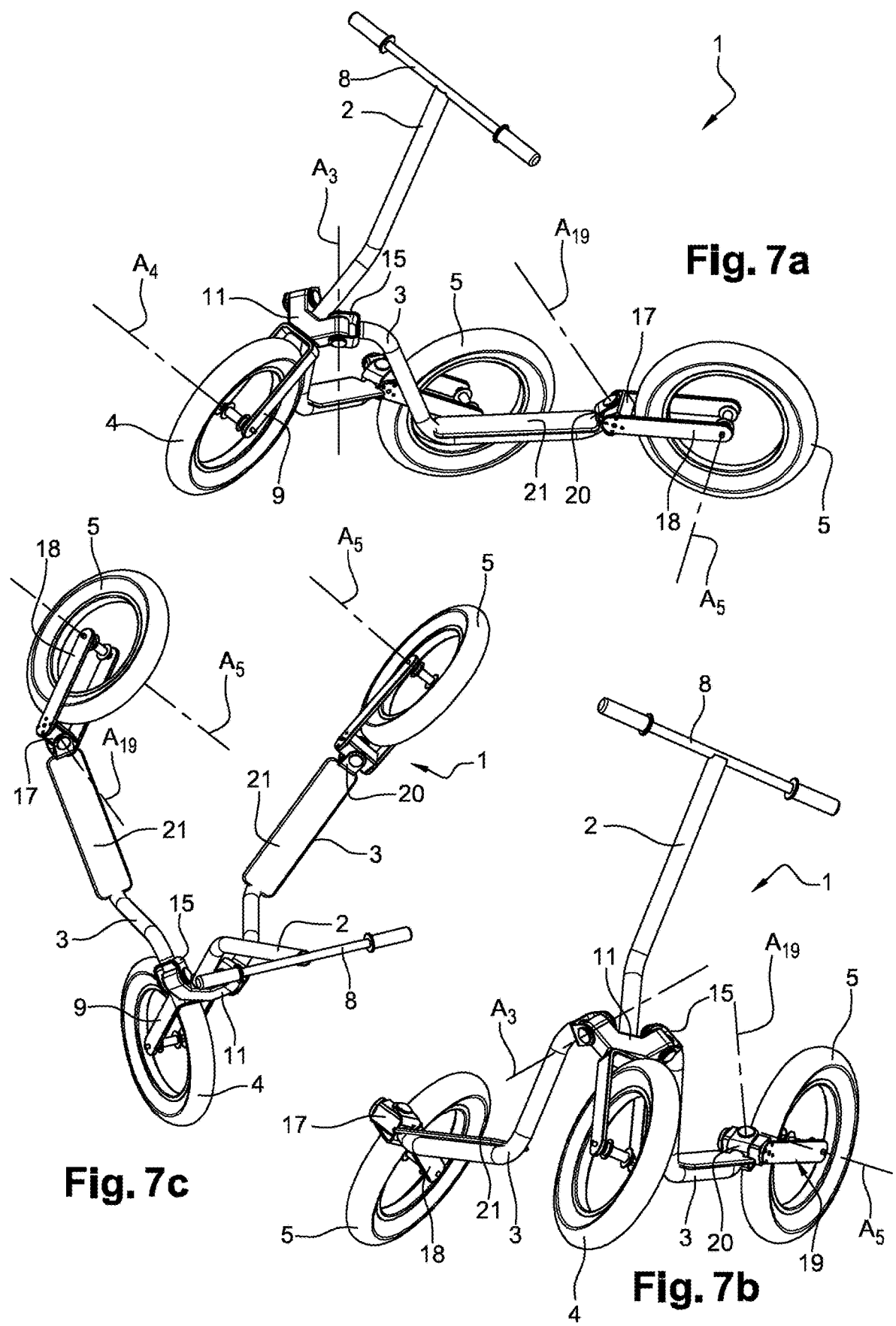

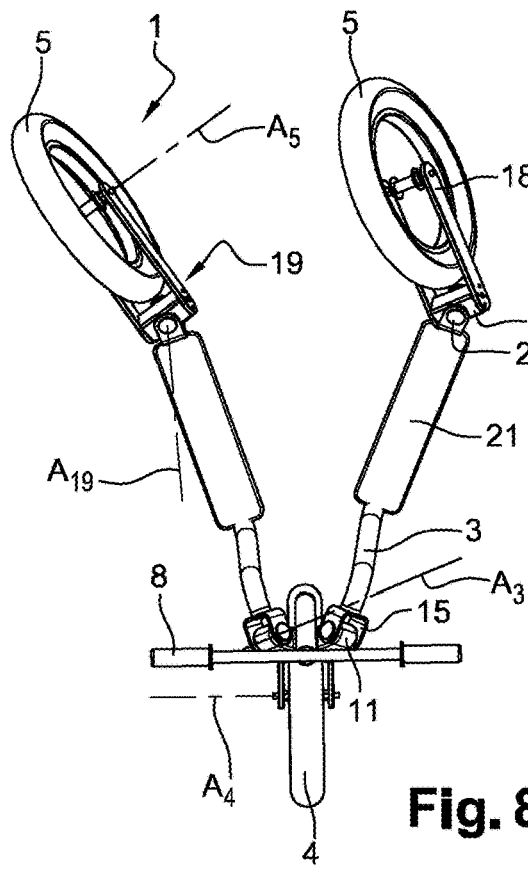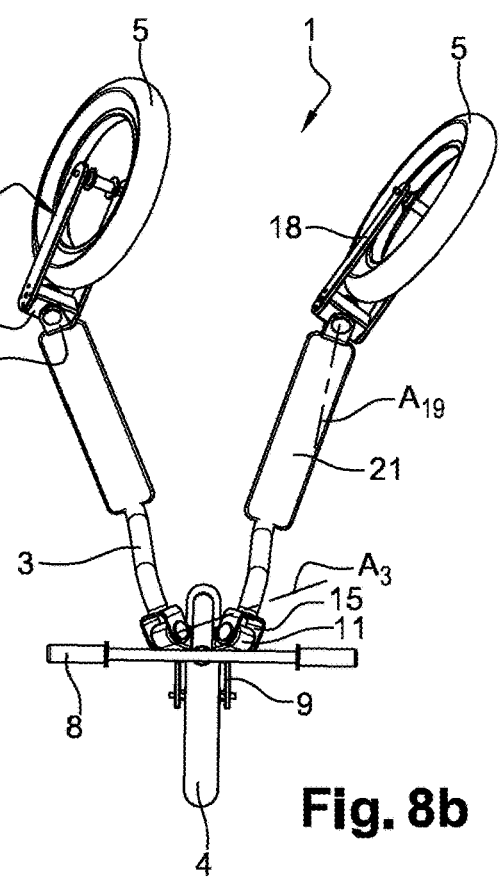
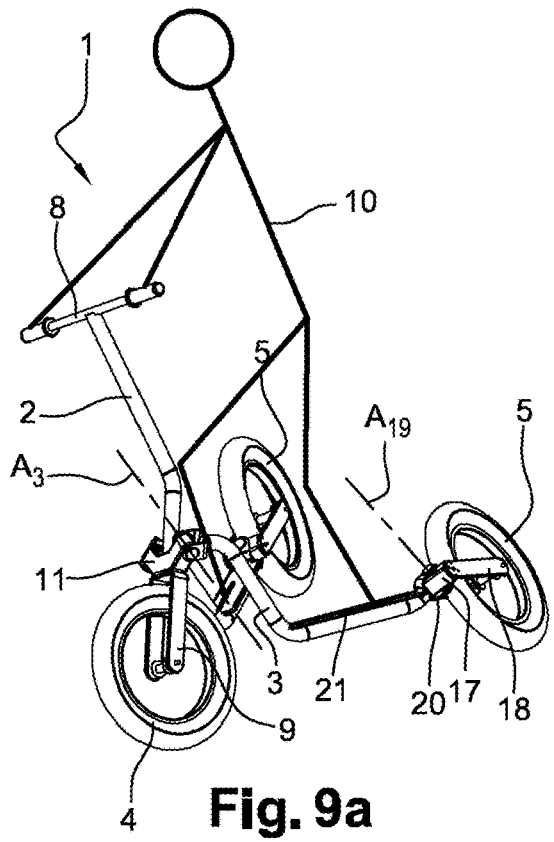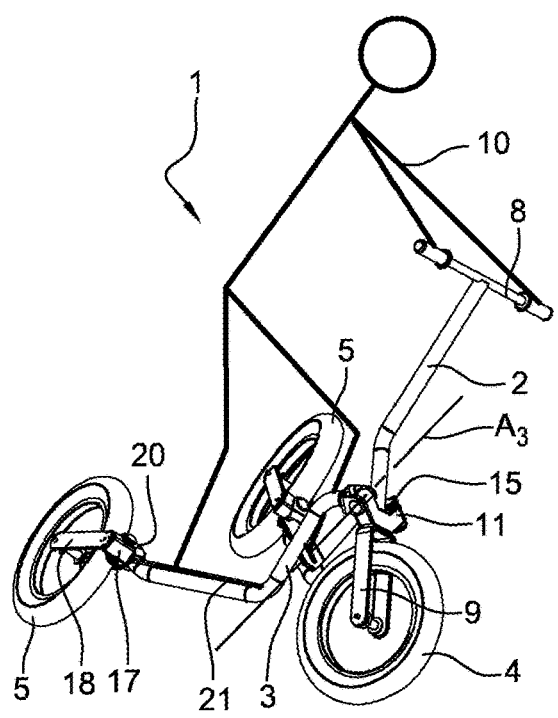
Fig. 8a  Fig. 8b
Fig. 9a  Fig. 9b

THREE-WHEELED SCOOTER

CROSS REFERENCE TO RELATED APPLICATIONS

This application is a National Stage of PCT Application No. PCT/FR2017/052790 filed on Oct. 11, 2017, which claims priority to French Patent Application No. 16/60440 filed on Oct. 27, 2016, the contents each of which are incorporated herein by reference thereto.

BACKGROUND

The present invention concerns a scooter.

More specifically, the invention relates to a three-wheeled scooter, or kick scooter, that is to say of the type comprising a steered front wheel actuated by the user via a steering column, and two spars which support the feet of the user, each spar being associated with the steering column and carrying a rear wheel.

Such a three-wheeled scooter is generally used for an entertaining and sporting practice. In particular, it enables a progression on a flat ground without impulse of a foot on the ground, but by a pushing movement on the spars. It can be either a sculling movement obtained by alternating actions of the feet on one spar and then on the other one, or by a symmetrical scissors movement generated by a symmetrical lateral pushing movement of the feet.

Three-wheeled scooters are very interesting in that they allow a complete muscular exercise, involving the legs and the arms. Nonetheless, known three-wheeled scooters have a major limitation, since they do not allow riding uphill or on a non-smooth ground, because of the low yield of the propulsion mode.

BRIEF SUMMARY

The present invention aims at overcoming this disadvantage.

To this end, the invention concerns a scooter which, in the neutral position, has a longitudinal plane of symmetry and includes:
 a generally vertical steering column;
 a front wheel having an axis which is secured to the steering column;
 a base relative to which the steering column is pivotally mounted about a steering axis, to enable the steering of the front wheel;
 two spars which support the feet of the user;
 two rear wheels.

Furthermore, according to the invention:
 each spar comprises a front portion which is pivotally mounted on the base about a pivot axis arranged so as to form with the longitudinal plane of symmetry, in projection in a transverse plane, an angle α comprised between 30° and 60°;
 and each rear wheel is rotatably mounted on a support about its axis, said support being pivotally mounted relative to the rear portion of the corresponding spar about a hinge axis which is inclined forwards, with respect to the vertical, by an angle γ comprised between 0° and 30°.

In other words, in the scooter according to the invention, on the one hand, the pivot axes are arranged symmetrically relative to each other with respect to the longitudinal plane of symmetry P1, in the neutral position, by forming therebetween an angle of 2α. In addition, the pivot axes are obliquely arranged with respect to this plane P1. This means that, when looking at the scooter in the longitudinal direction, from the front, a given pivot axis is neither orthogonal to the plane P1 (that is to say that the axis is not horizontal), nor parallel to P1 (that is to say that the axis is not vertical).

On the other hand, the rear wheels can pivot relative to a hinge axis which is substantially vertical (when γ=0) or inclined forwards.

The combination of these two geometrical features allows obtaining specific effects that are not found in scooters of the prior art, namely:
 The traction of the steering column rearwards causes a separation of the spars, i.e. causes the spars to move apart from one another (or causes an approach of the spars, i.e. causes the spars to move closer to one another, depending on the orientation of the pivot axes), and therefore causes a separation of the feet of the user and a separation of the rear wheels; conversely, pushing the steering column forwards causes the hinged spars to move closer (or to move apart depending on the orientation of the pivot axes);
 The combined and concordant action of the user by the arms on the steering column and by the feet on the spars increases the separation/approach force of the rear wheels;
 The direction changes may result from the steering of the front wheel or from the pivoting of the rear wheels or from the combination thereof;
 The inclination is possible when turning to compensate for the centrifugal force resulting from the steering of the rear and front wheels.

Thanks to the combination of the oblique arrangement of the pivot axes and of the pivoting mounting of the rear wheels about the hinge axis, the scooter according to the invention allows obtaining a forward movement by a simultaneous action of the rower type from the upper body (alternating movement of the arms and of the trunk acting on the steering column) and of the scissor type from the legs (lateral movement).

This results in:
 A considerable increase in yield, which is particularly crucial on uneven or uphill ground. It has thus been calculated that, with equal effort with regards to a scooter of the prior art, the yield is doubled. Therefore, the invention allows climbing slopes up to 5% on a coated ground with a measured effort, and up to 7% or even 10% with a sustained effort;
 The possibility of varying the distribution of efforts between the legs and the arms;
 The choice of a skater alternating movement or a rower symmetrical movement;
 The choice of the amplitude of the alternating movement;
 An ability for inclination in turning and for crossing significant transverse slopes;
 Entertainment and strong sensations due to the diversity and scope of movements and angle developments.

The angle α may be comprised between 40° and 50°, for example close to 45°.

According to one possible embodiment, viewed in projection in a transverse plane, the two pivot axes converge upwards. We then have a reverse V-shaped arrangement. The reverse arrangement (in a V shape with the apex pointing downwards) is also possible. In this case, the operation would be reversed, that is to say that a traction on the steering column would result the spars moving closer to one another.

Furthermore, viewed in projection in the longitudinal plane of symmetry (P1), each pivot axis can form with the steering axis an angle β comprised between 0° and 30°, forwards or rearwards, in the neutral position.

In other words, each pivot axis can be comprised within a symmetrical angular sector with respect to the steering axis, and delimited by two straight lines forming therebetween an angle of 2β. This means that the plane defined by the pivot axes does not necessarily include the steering axis. Preferably, the angle β can be comprised between 0° and 20°. Being able to vary the angle β is interesting because it has the effect of increasing or reducing the effects of the angle α in the relationship between the spacing of the spars and the inclination of the steering column. The effect is neutral if the angle β is zero.

Moreover, it can be provided that the angle γ between the hinge axis of the support of a rear wheel and the vertical is comprised between 10° and 30°, in the neutral position. The arrangement of this hinge axis in a non-vertical way aims at promoting a self-stability (return to neutral).

According to one possible embodiment, the base has a central portion mounted in the lower portion of the steering column, above the front wheel, and two lateral wings, the pivot axis between the base and the front portion of each spar being arranged in the vicinity of the free end of each lateral wing.

For example, the central portion of the base is oriented substantially transversely and each lateral wing extends from one end of the central portion upwards and away from the longitudinal plane of symmetry (P1) in the neutral position.

The front portion of each spar may comprise a yoke having two arms between which is received the free end portion of the corresponding lateral wing of the base, the pivot axis between the base and the front portion of the spar being substantially orthogonal to both arms of said yoke.

According to one possible embodiment, the support of a rear wheel includes a base oriented substantially transversely, in the neutral position, and at least one lateral branch, and the rear portion of each spar comprises a yoke having two arms between which is received the base of the support, the pivot axis between the base of the support and the corresponding spar being substantially orthogonal to the two arms of said yoke. In this embodiment, the support of the rear wheel may have an L shape. Alternatively, such a support may consist of a fork, that is to say it may include a base and two lateral branches forming a U.

BRIEF DESCRIPTION OF THE DRAWINGS

Several possible embodiments of the invention are now described as non-limiting examples, with reference to the appended figures:

FIGS. 2a and 2b are respectively top and front views of the scooter in the neutral position;

FIGS. 3a and 3b are top and front views, respectively, of the scooter when the steering column is pulled rearwards and the spars are spaced apart;

FIGS. 7a, 7b and 7c illustrate the scooter in a turn;

FIGS. 8a and 8b illustrate two configurations of the scooter when it moves forward thanks to a sculling movement;

FIGS. 9a and 9b illustrate two configurations of the scooter when it moves forward thanks to a skater movement, with speed and angle development;

Figure 1:
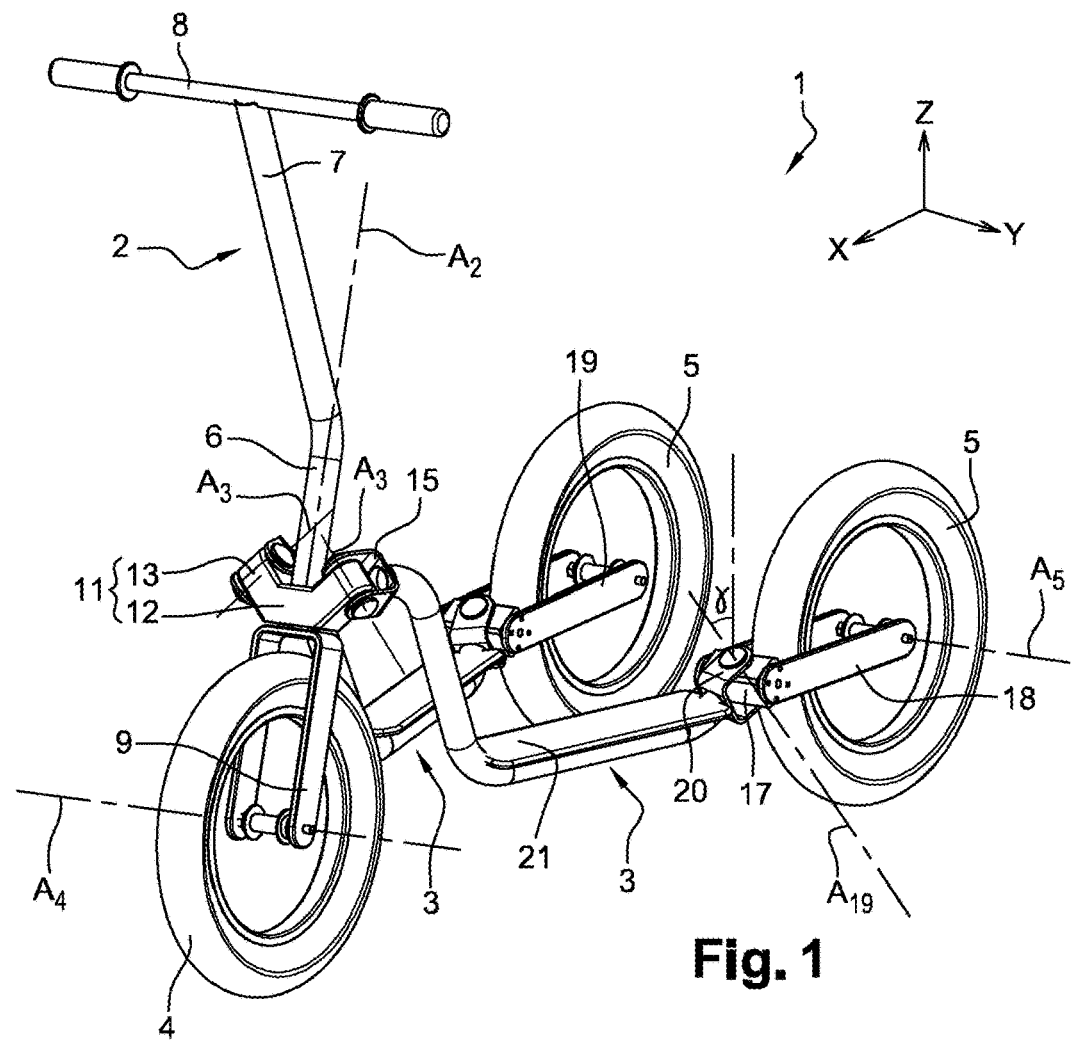
FIG. 1 is a perspective view of a scooter according to one embodiment of the invention, in the neutral position, that is to say when it is moving forwards in a straight line, the spars being brought close to each other; and the steering column being oriented forwards.

The invention concerns a scooter 1 which comprises a steering column 2, two spars 3 (or beams or bars) on which the feet of the user 10 are supported, a front wheel 4 and two rear wheels 5.

DETAILED DESCRIPTION

In FIG. 1, the scooter 1 is represented in the neutral position, that is to say when it is moving forwards in a straight line, the spars 3 being close to each other and the steering column 2 being oriented forwards. First of all, the scooter 1 will be described when it occupies this neutral position.

Referring to FIG. 1 are defined the longitudinal direction X, with regards to which the terms "front" and "rear" are used, the transverse direction Y with regards to which the term «lateral» is used, and the vertical direction Z.

Figure 2A:
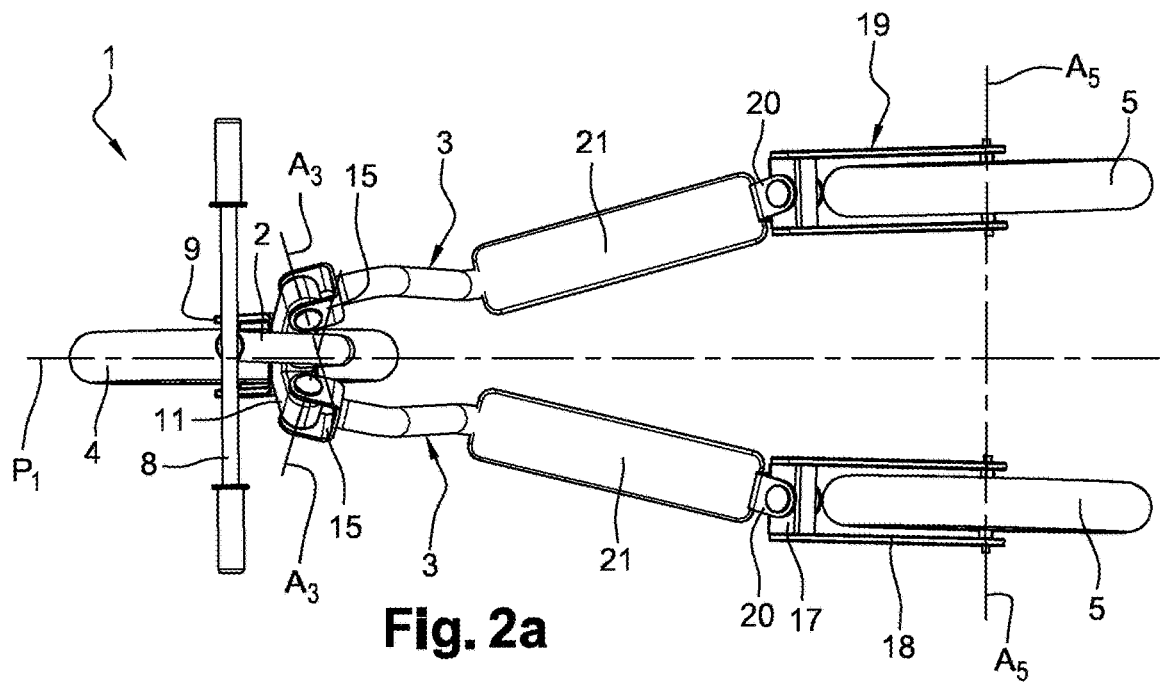
Figure 4:
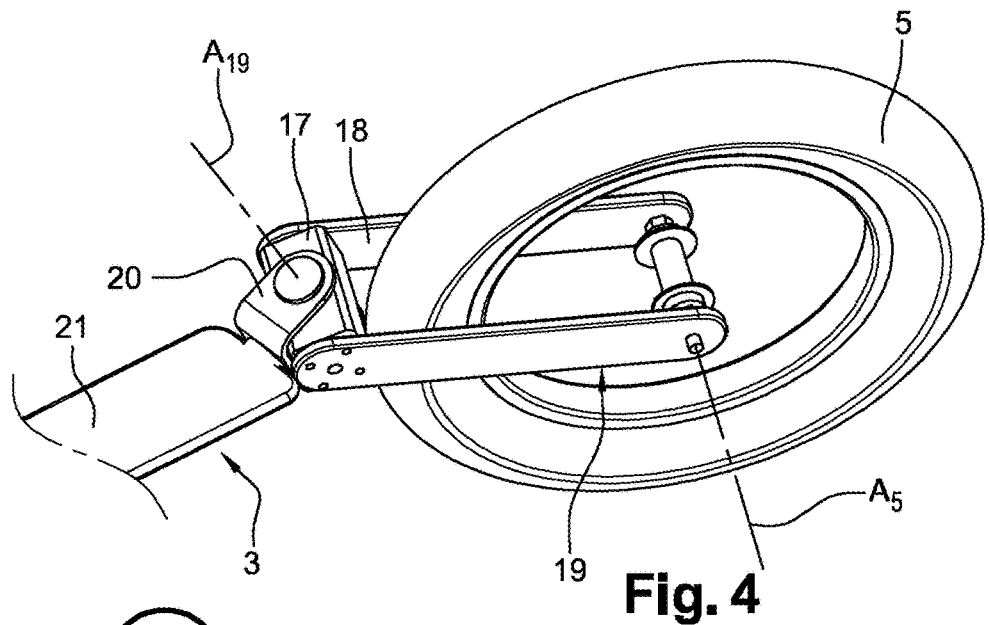
FIG. 4 is a detail view of a rear wheel and of its mounting on a spar.

In the neutral position, the scooter 1 has a longitudinal plane of symmetry P1 (see in particular FIGS. 2a and 2b).

The steering column 2 is generally vertical, and contained in the plane P1. As shown in particular in FIG. 5a, it can be provided that the steering column includes a lower portion 6 which is inclined with respect to the vertical by an angle in the range of 15°, rearwards and from the bottom to the top, and an upper portion 7 which is inclined with respect to the vertical by an angle in the range of 20°, for example, forwards and from the bottom to the top. This arrangement allows increasing the stability and promoting the steering return.

At the upper portion of the steering column 2 is fastened a handlebar 8, provided with handles, which can be grasped by the user 10, whereas at the lower portion is fastened a support of the front wheel 4, for example in the form of a fork 9.

More particularly, the fork 9 has a U shape including a base transversely oriented and fastened to the lower portion of the steering column 2, as well as two lateral branches parallel to the plane P1 and carrying at their end the rotation axis A4 of the front wheel 4. Thus, the front wheel 4 is rotatably mounted about its axis A4 relative to the steering column 2, the axis A4 being oriented transversely in the neutral position.

The scooter 1 also comprises a base 11 relative to which the steering column 2 is pivotally mounted about a steering axis A2, to enable the steering of the front wheel 4.

The base 11 may have on the one hand a central portion 12 mounted in the lower portion of the steering column 2, above the front wheel 4 and the fork 9, and oriented substantially transversely. On the other hand, the base 11 may have two lateral wings 13 which extend from one end of the central portion 12 upwards and away from the longitudinal plane of symmetry P1, in the neutral position.

Each spar 3 comprises a front portion which is pivotally mounted on the base 11 about a pivot axis A3 and a rear portion associated with one of the rear wheels 5.

In the neutral position, the pivot axis A3 is obliquely arranged with respect to the plane P1, the two pivot axes A3 being symmetrical with respect to P1.

More specifically, as shown in particular in FIG. 2b, the pivot axis A3 forms an angle α with the longitudinal plane of symmetry P1, in projection in a transverse plane (Y, Z), this angle α being comprised between 30° and 60°. According to a possible embodiment, the angle α is comprised between 40° and 50°, for example close to 45°. In the embodiment represented in the figures, the two pivot axes A3 converge upwards, viewed in projection in a transverse plane (Y, Z). Nonetheless, this arrangement should not be considered as limiting.

Figure 5A:
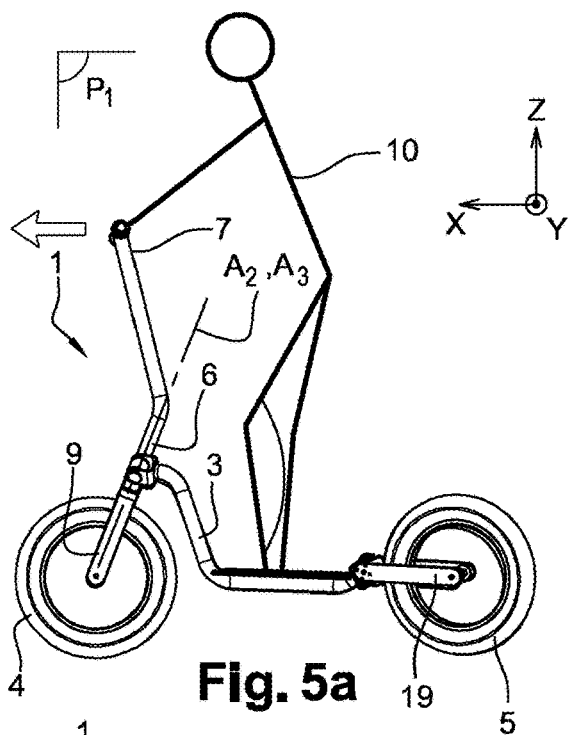
FIGS. 5a to 6c illustrate the scooter when it is moving forward, by a combination of a forwards pushing movement of the steering column and of an approaching movement of the spars (FIGS. 5a, 5b and 5c) and then of a the traction rearwards of the steering column and a separation of the spars (FIGS. 6a, 6b and 6c)

In addition, still in the neutral position, and viewed in projection in the longitudinal plane of symmetry (P1), each pivot axis A3 may be substantially vertical. Alternatively, the pivot axis A3 may form with the steering axis A2 an angle β comprised between 0° and 30°, forwards or rearwards. In the embodiment illustrated as example in the figures, the angle β is zero, that is to say that the steering axis A2 and the pivot axes A3 are located in the same plane (and are therefore superimposed when viewed in projection in a longitudinal plane, as illustrated in FIG. 5a).

In concrete terms, the pivot axis A3 between the base 11 and the front portion of each spar 3 may be arranged in the vicinity of the free end of each lateral wing 13 of the base 11.

The assembly may be carried out as follows. The front portion of each spar 3 comprises a yoke 15 having two arms between which is received the free end portion of the corresponding lateral wing 13 of the base 11. The pivot axis A3 between the base 11 and the front portion of the spar 3 is substantially orthogonal to the two arms of said yoke 15.

Besides, each rear wheel 5 is mounted on a support which is for example in the form of a U-shaped fork 19 including a base 17 oriented substantially transversely, in the neutral position, and two lateral branches 18 parallel to the plane P1 and carrying at their end the rotation axis A5 of the rear wheel 5. Thus, the rear wheel 5 is rotatably mounted about its axis A5 relative to the support—namely the fork 19—the axis A5 being oriented transversely in the neutral position.

Furthermore, the fork 19 is pivotally mounted relative to the rear portion of the corresponding spar 3 about a hinge axis A19 which may be substantially vertical, or inclined forwards, with respect to the vertical, by an angle γ comprised between 0° and 30°, or even between 10° and 30° (see FIG. 1). A non-zero angle γ, for example in the range of 20°, has the effect of:

inclining the rear wheel 5 relative to the plane P1 during steering;

elevating the frame (that is to say the spars 3) in the range of 10 mm maximum when steering to the left or to the right with regards to its ground clearance in a straight line.

The assembly may be carried out as follows. The rear portion of each spar 3 comprises a yoke 20 having two arms between which is received the base 17 of the fork 19, the pivot axis A19 between the base 17 of the fork 19 and the corresponding spar 3 being substantially orthogonal to both arms of said yoke 20.

Furthermore, each spar 3 may include a substantially horizontal sole 21 allowing a more stable holding of the feet of the user.

In the embodiment represented in the figures, each fork 19 of the rear wheel 5 is substantially horizontal. Each spar 3 includes a portion which is substantially horizontal and at the level of the axis A5 of the rear wheel 5, on which is located the sole 21, extended forwards by a portion carrying the yoke 15, located higher, with respect to the ground, than the front wheel 4.

Nonetheless, other arrangements may be considered. In particular, with wheels of the scooter 1 having a smaller diameter, the lateral branches 18 of the fork 19 of the rear wheel 5 may be inclined downwards and rearwards, for enhanced ergonomics, the sole 3 then lying above the axis A5 of the rear wheel 5.

The possible movements and configurations of the scooter 1 when it is used are now described.

In FIGS. 2a to 3b, the scooter 1 is represented during a displacement in a straight line. The inclination of the pivot axes A3 according to the angle α, as previously described, makes inseparable a separation/approach movement of the spars 3 carrying the rear wheels 5 and a pivoting movement from front to back of the steering column 2.

More specifically, with a relative arrangement of the pivot axes A3 in a V shape having the apex directed upwards, a steering column 2 located forwards corresponds to the spars 3 brought closer to each other (FIGS. 2a and 2b), whereas a steering column 2 located rearwards corresponds to spaced spars 3 (FIGS. 3a and 3b).

FIGS. 5a to 6c illustrate a forward movement of the scooter 1 by a combined movement of the user exerted by the arms on the steering column 2 and by the legs on the spars 3.

Figure 5B:
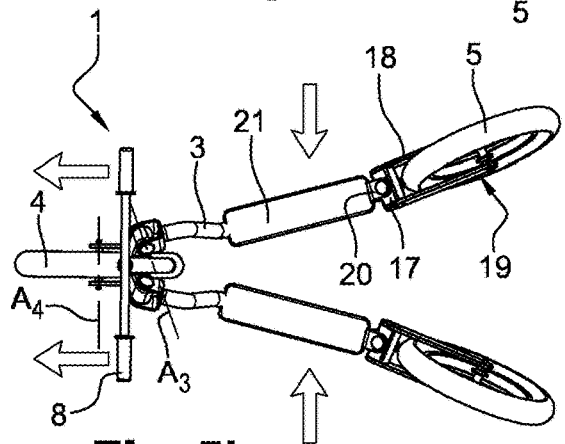
Figure 5C:
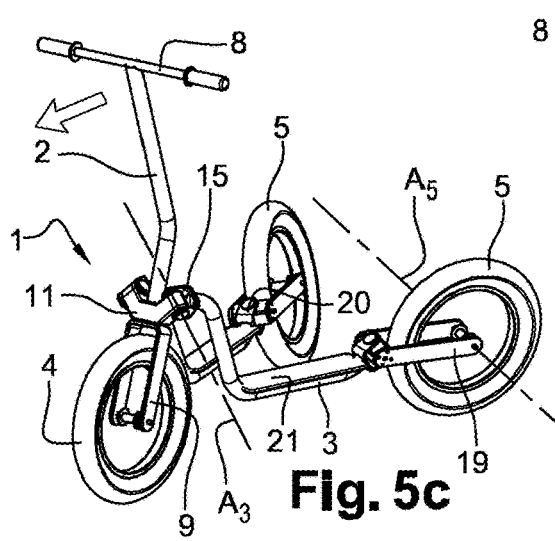

In FIGS. 5a, 5b and 5c, which show the scooter 1 respectively from the side, from above and in perspective, it can be seen that the forwards push on the steering column 2 results in an approach of the rear wheels 5 (and an approach of the rear wheels 5 results in a forwards displacement of the steering column 2). Furthermore, the rear wheels 5 take a converging directional angle when they are brought close to each other, and a positive camber.

Figure 6A:
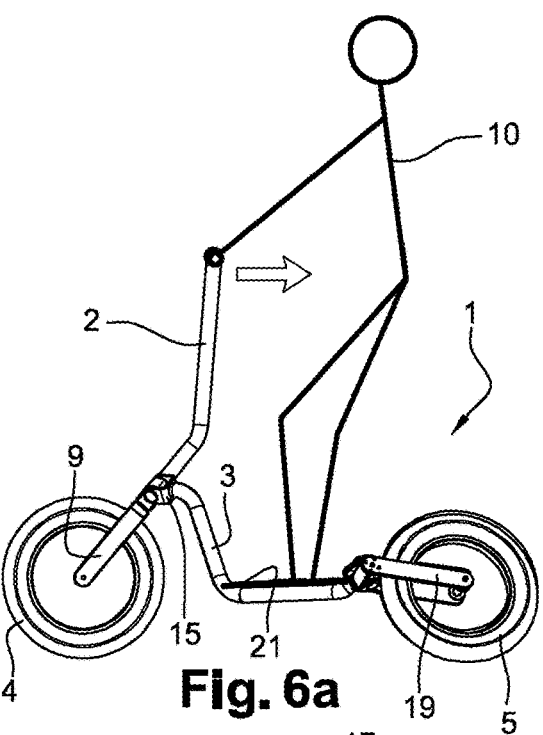
Figure 6B:
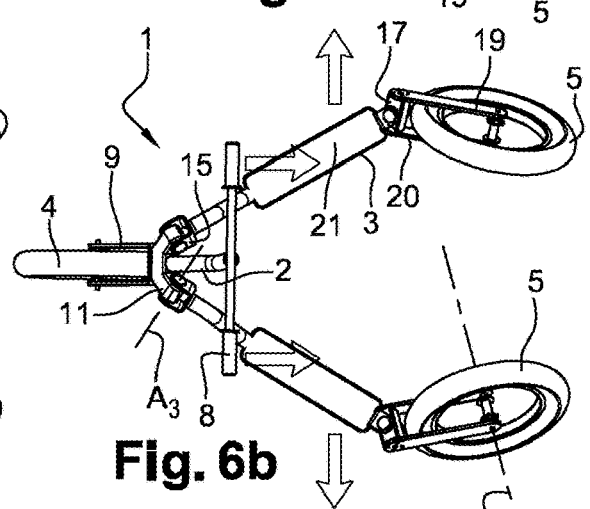
Figure 6C:
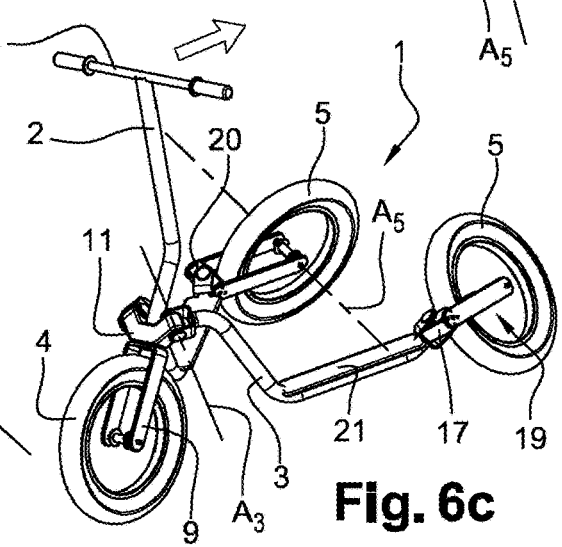

In FIGS. 6a, 6b and 6c, which show the scooter 1 respectively from the side, from above and in perspective, it can be seen that a rearwards traction on the steering column 2 results in a separation of the rear wheels 5 (and a separation of the rear wheels 5 results in a rearwards displacement of the steering column 2). Furthermore, the rear wheels 5 take a diverging directional angle when they are brought away from each other, and a negative camber.

FIGS. 7a and 7c show, respectively in lateral perspective, in front perspective and in top views, the configuration of the scooter 1 when turning. It is in particular shown that the rear wheels 5 have pivoted relative to the hinge axis A19, and do not remain oriented in the continuation of the spars 3.

FIGS. 8a and 8c show the configuration of the different components of the scooter 1, and in particular the behavior of the wheels, during a forwards progression by a sculling movement.

In FIGS. 9a and 9b is illustrated the scooter 1 when the user exerts lateral pushing efforts alternately to the left and to the right, in a skater movement, with speed and angle development. The rear wheels are then steered and inclined in the same direction.

In practice, if a lateral force perpendicular to the longitudinal axis X is applied at the level of the spars 3, this will have the effect of steering the rear wheels 5 until abutment and making them roll obliquely in the steering direction, while the front wheel 4 will roll in the direction imposed by the user 10.

In this steering situation of the rear wheels 5:
if the front wheel 4 is held parallel to the frame, the scooter 1 will turn on itself,
If the front wheel 4 is held in the direction selected by the user 10, the scooter 1 will indeed roll in this direction but by moving in a "crab"-like fashion.

In the normal drive position, the user 10 has no support on the ground but uses the traction force on the steering column 2 to generate with the legs a lateral force at the pivots of the rear wheels 5. On a flat and smooth ground, the first lateral impulse already has the effect of slightly advancing the scooter 1, but an alternating movement quickly produces an acceleration. Speeding is even faster if an initial impulse is given by applying a pushing effort on the ground. Once the movement is initiated, it allows maintaining, on a flat ground, a relatively high speed with little effort.

The initial lateral pushing force cannot cause a rearwards movement because of the orientation of the rear wheels 5 which imposes an oblique forward movement of the rear axle.

The lateral force applied by the user 10 has the effect, when the rear wheels 5 pivot relative to the axis of the frame, of slightly raising the latter which stores a potential energy which is restored when the wheel returns in a straight line, which facilitates the alternating movement.

Figure 10:
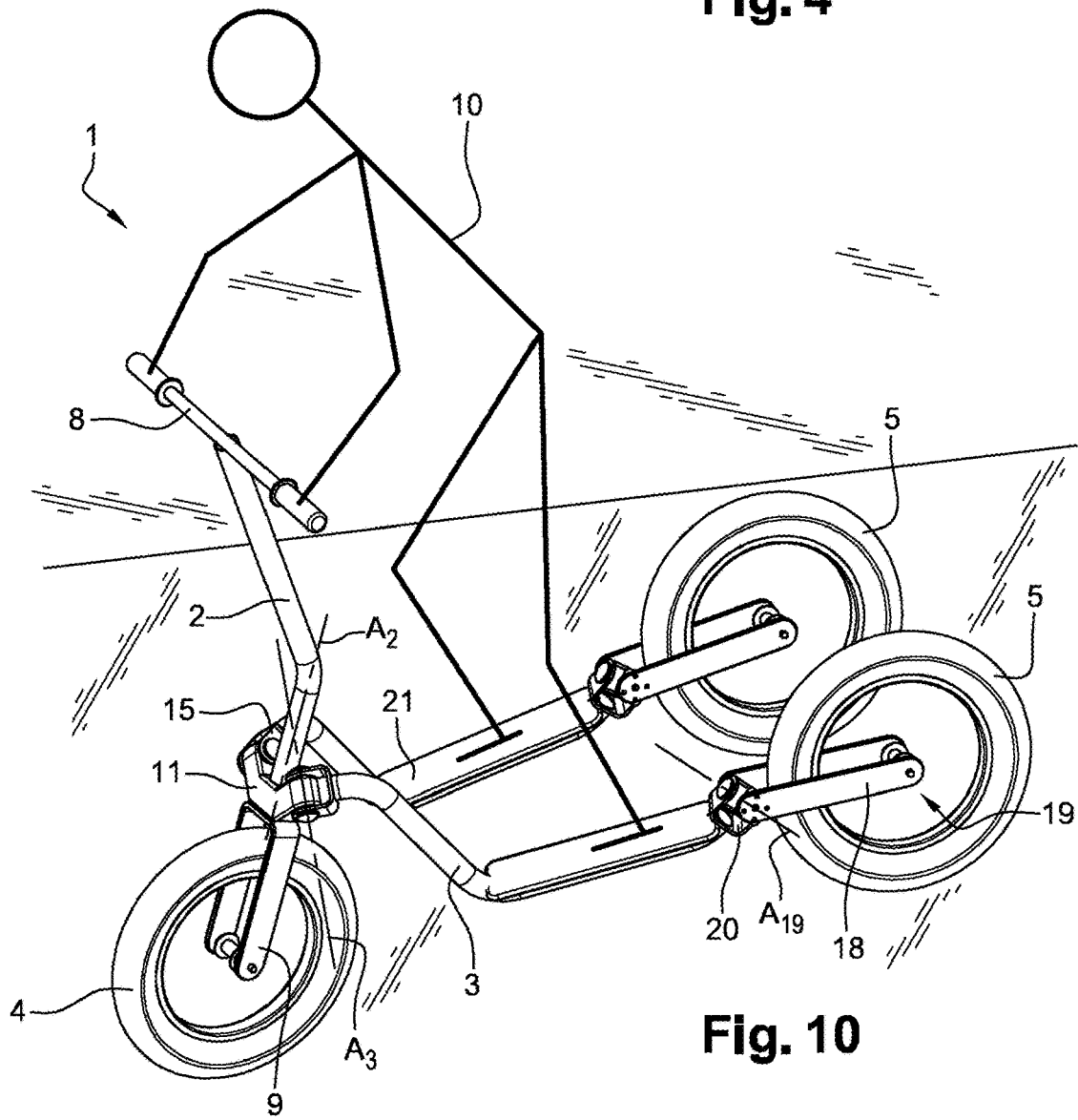
FIG. 10 illustrates the scooter in a transversely slopped terrain.

Finally, FIG. 10 shows that the scooter 1 can be used in a sloping terrain, including on uncoated terrain.

Thus, the invention provides a decisive improvement to the prior art.

The arrangement of the pivot axes obliquely (angle α) makes inseparable a separation/approach movement of the spars carrying the rear wheels and a pivoting movement from front to back of the steering column and results in an increase in propulsion efficiency. Nonetheless, this arrangement alone would not be sufficient. Thanks to the invention, which further provides for a pivoting mounting of the rear wheels about the hinge axis, the wheels do not remain in a fixed position that would prevent the scooter from moving forward.

Thus, the invention allows considerably extending the field of practice of the three-wheeled scooter by enabling progression in uphill and on uncoated terrains. The invention thus allows combining the benefits in terms of physical exercise and entertainment, by providing gliding sensations on various terrains, and avoiding weariness.

Furthermore, on a smooth and flat floor, the progression can be made, without variation of the position of the steering column and the arms, by an alternating sculling movement as is the case with some scooters of the prior art, but with a quite higher movement amplitude.

It goes without saying that the invention is not limited to the embodiments described above as examples but it comprises all technical equivalents and variants of the described means and the combinations thereof.

The invention claimed is:

1. A scooter which, in a neutral position, has a longitudinal plane of symmetry and includes:
    a generally vertical steering column;
    a front wheel having an axis which is secured to the steering column;
    a base relative to which the steering column is pivotally mounted about a steering axis, to enable steering of the front wheel;
    two spars configured to support feet of a user;
    two rear wheels;
    wherein each spar of the two spars comprises a front portion that is pivotally mounted on the base about a pivot axis arranged so as to form with the longitudinal plane of symmetry, in projection in a transverse plane, an angle α comprised between 30° and 60°;
    and wherein each rear wheel of the two rear wheels is rotatably mounted on a support about an axis, the support being pivotally mounted to a rear portion of a corresponding spar of the two spars about a hinge axis which is inclined forwards, with respect to the longitudinal plane of symmetry and a vertical plane extending from the longitudinal plane of symmetry, by an angle γ comprised between 0° and 30°.

2. The scooter according to claim 1, wherein the angle α is comprised between 40° and 50°.

3. The scooter according to claim 2, wherein, viewed in projection in a transverse plane, the pivot axis of each spar of the two spars converges upwards.

4. The scooter according to claim 3, wherein, viewed in projection in the longitudinal plane of symmetry, the pivot axis of each spar of the two spars is capable of forming with the steering axis an angle β comprised between 0° and 30°, forwards or rearwards with respect to the longitudinal plane of symmetry, in the neutral position.

5. The scooter according to claim 4, wherein the angle γ is comprised between 10° and 30°, in the neutral position.

6. The scooter according to claim 5, wherein the base has a central portion mounted in a lower portion of the steering column, above the front wheel, and the base has two lateral wings, the pivot axis between the base and the front portion of each spar of the two spars extending through each lateral wing of the two wings.

7. The scooter according to claim 6, wherein the central portion of the base is oriented substantially transversely and each lateral wing of the two lateral wings extends from one end of the central portion upwards and away from the longitudinal plane of symmetry in the neutral position.

8. The scooter according claim 7, wherein the front portion of each spar of the two spars comprises a yoke having two arms between which is received is a free end portion of a corresponding lateral wing of the two lateral wings of the base, the pivot axis between the base and the front portion of each spar of the two spars being substantially orthogonal to the two arms of the yoke.

9. The scooter according to claim 8, wherein the support includes a base oriented substantially transversely, in the neutral position, and at least one lateral branch, and the rear portion of each spar of the two spars comprises a yoke having two arms between which is received is the base of the support, the pivot axis between the base of the support and a corresponding spar of the two spars being substantially orthogonal to the two arms of the yoke.

10. The scooter according to claim 9, wherein the steering column includes a lower portion which is inclined with respect to the vertical plane by an angle in the range of 15°, and the lower portion extends rearwards and upwards with respect to the longitudinal plane of symmetry, and the steering column includes an upper portion which is inclined with respect to the vertical plane by an angle in the range of 20°, and the upper portion extends forwards and upwards with respect to the longitudinal plane of symmetry.

11. The scooter according to claim 2, wherein, viewed in projection in the longitudinal plane of symmetry, the pivot axis of each spar of the two spars is capable of forming with the steering axis an angle β comprised between 0° and 30°, forwards or rearwards with respect to the longitudinal plane of symmetry, in the neutral position.

12. The scooter according to claim 1, wherein, viewed in projection in a transverse plane, the pivot axis of each spar of the two spars converges upwards.

13. The scooter according to claim 12, wherein, viewed in projection in the longitudinal plane of symmetry, the pivot axis of each spar of the two spars is capable of forming with the steering axis an angle β comprised between 0° and 30°, forwards or rearwards with respect to the longitudinal plane of symmetry, in the neutral position.

14. The scooter according to claim 1, wherein, viewed in projection in the longitudinal plane of symmetry, the pivot axis of each spar of the two spars is capable of forming with the steering axis an angle β comprised between 0° and 30°, forwards or rearwards with respect to the longitudinal plane of symmetry, in the neutral position.

15. The scooter according to claim 1, wherein the angle γ is between 10° and 30°, in the neutral position.

16. The scooter according to claim 1, wherein the base has a central portion mounted in a lower portion of the steering column, above the front wheel, and the base has two lateral wings, the pivot axis between the base and the front portion of each spar of the two spars extending through each lateral wing of the two lateral wings.

17. The scooter according to claim 16, wherein the central portion of the base is oriented substantially transversely and each lateral wing of the two lateral wings extends from one end of the central portion upwards and away from the longitudinal plane of symmetry in the neutral position.

18. The scooter according claim 16 or 17, wherein the front portion of each spar of the two spars comprises a yoke having two arms between which is received is a free end portion of a corresponding lateral wing of the two lateral wings of the base, the pivot axis between the base and the front portion of each spar of the two spars being substantially orthogonal to the two arms of the yoke.

19. The scooter according to claim 1, wherein the support includes a base oriented substantially transversely, in the neutral position, and at least one lateral branch, and the rear portion of each spar of the two spars comprises a yoke having two arms between which is received is the base of the support, the pivot axis between the base of the support and a corresponding spar of the two spars being substantially orthogonal to the two arms of the yoke.

20. The scooter according to claim 1, wherein the steering column includes a lower portion which is inclined with respect to the vertical plane by an angle in the range of 15°, and the lower portion extends rearwards and upwards with respect to the longitudinal plane of symmetry, and the steering column includes an upper portion which is inclined with respect to the vertical plane by an angle in the range of 20°, and the upper portion extends forwards and upwards with respect to the longitudinal plane of symmetry.

21. The scooter according to claim 1, wherein the angle α is close to 45°.

* * * * *